(12) United States Patent
Salter et al.

(10) Patent No.: US 11,708,016 B2
(45) Date of Patent: Jul. 25, 2023

(54) VEHICLE ASSIST HANDLE ASSEMBLY HAVING PROXIMITY SENSOR CONTROL

(71) Applicant: Ford Global Technologies, LLC, Dearborn, MI (US)

(72) Inventors: Stuart C. Salter, White Lake, MI (US); Jim Baumbick, Northville, MI (US); Annette Lynn Huebner, Highland, MI (US); David Brian Glickman, Southfield, MI (US); Benjamin Yilma, Canton, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 404 days.

(21) Appl. No.: 17/141,356

(22) Filed: Jan. 5, 2021

(65) Prior Publication Data
US 2022/0212587 A1    Jul. 7, 2022

(51) Int. Cl.
| | | |
|---|---|---|
| *B60N 3/02* | (2006.01) | |
| *B60R 16/03* | (2006.01) | |
| *H04W 4/48* | (2018.01) | |
| *B60R 16/02* | (2006.01) | |
| *G01D 5/24* | (2006.01) | |
| *B60R 16/023* | (2006.01) | |

(52) U.S. Cl.
CPC .............. *B60N 3/02* (2013.01); *B60N 3/026* (2013.01); *B60R 16/023* (2013.01); *B60R 16/0207* (2013.01); *B60R 16/03* (2013.01); *G01D 5/24* (2013.01); *H04W 4/48* (2018.02)

(58) Field of Classification Search
CPC .................................. B60N 3/02; B60N 3/026
USPC ......................................................... 296/1.02
See application file for complete search history.

(56) References Cited

U.S. PATENT DOCUMENTS

| | | | |
|---|---|---|---|
| 6,431,643 B2 * | 8/2002 | Grey ...................... | B60N 3/023 296/214 |
| 8,922,340 B2 * | 12/2014 | Salter .................. | G07C 9/00714 340/5.2 |
| 9,127,488 B2 * | 9/2015 | Savant ..................... | E05B 79/06 |
| 9,903,142 B2 * | 2/2018 | Van Wiemeersch .... | E05B 81/76 |
| 10,351,101 B2 * | 7/2019 | Neuhoff .................. | B60R 25/31 |
| 10,378,254 B1 * | 8/2019 | Salter ....................... | E05B 81/76 |
| 11,584,282 B2 * | 2/2023 | Xiao ........................ | B60N 3/02 |
| 2015/0330112 A1 | 11/2015 | Van Wiemeersch et al. | |
| 2018/0099610 A1 * | 4/2018 | Meyers ................. | F21V 19/003 |

FOREIGN PATENT DOCUMENTS

| | | | | |
|---|---|---|---|---|
| CN | 105818725 B | * | 3/2018 | |
| CN | 108116290 A | * | 6/2018 | ............ B60N 2/002 |
| DE | 102018221662 A1 | | 6/2020 | |
| EP | 1122125 A1 | * | 8/2001 | ............ B60N 2/002 |

* cited by examiner

*Primary Examiner* — Dennis H Redder
(74) *Attorney, Agent, or Firm* — Vichit Chea; Price Heneveld LLP

(57) ABSTRACT

An assist handle assembly for use in an interior of a vehicle is provided. The assist handle assembly includes an assist handle configured to be gripped by a user, a connector configured to secure the assist handle assembly to a structural component in the interior of the vehicle, a proximity sensor assembly coupled to the assist handle for generating a sensed signal indicative of a user gripping the assist handle, and a controller controlling one or more vehicle devices based on the sensed signal.

20 Claims, 13 Drawing Sheets

US 11,708,016 B2

VEHICLE ASSIST HANDLE ASSEMBLY HAVING PROXIMITY SENSOR CONTROL

FIELD OF THE DISCLOSURE

The present disclosure generally relates to assist handles, and more particularly relates to a vehicle assist handle assembly having one or more sensors and related controls.

BACKGROUND OF THE DISCLOSURE

Automotive vehicles are commonly equipped with handle structures referred to as passenger assist handles for passengers to grasp with their hand when entering and exiting the vehicle and during maneuvering of the vehicle. Assist handles can be particularly useful for off-road-style vehicles while driving on rough terrain. In off-road style vehicles and other types of vehicles, it may be desirable to enhance the functionality of the assist handle, particularly for customizable vehicle interiors.

SUMMARY OF THE DISCLOSURE

According to a first aspect of the present disclosure, an assist handle assembly for a vehicle is provided. The assist handle assembly for a vehicle includes an assist handle configured to be gripped by a user, a connector configured to secure the assist handle assembly to a structural component of the vehicle, a proximity sensor assembly coupled to the assist handle for generating a sensed signal indicative of a user gripping the assist handle, and a controller controlling one or more vehicle functions based on the sensed signal.

Embodiments of the first aspect of the disclosure can include any one or a combination of the following features:
- the connector is releasable to allow for assembly and disassembly of the assist handle assembly from the vehicle;
- a power cable for connecting to a vehicle power supply;
- the vehicle function comprises at least one of adjusting a seat device;
- the seat device comprises at least one of a seat belt, a seat belt bolster, and a seat air bladder;
- the vehicle function comprises at least one of adjusting vehicle suspension shocks;
- a communication link;
- the communication link is configured to communicate with a controller onboard the vehicle;
- the communication link comprises a wireless communication link;
- the connector is configured to connect to a bracket in an interior portion of the vehicle;
- the assist handle comprises one or more proximity sensors; and
- the one or more proximity sensors comprises one or more capacitive sensors.

According to a second aspect of the present disclosure, an assist handle assembly for use in an interior of a vehicle is provided. The assist handle assembly for use in an interior of a vehicle includes an assist handle configured to be gripped by a user, a connector configured to secure the assist handle assembly to a structural component in the interior of the vehicle, a proximity sensor assembly coupled to the assist handle for generating a sensed signal indicative of a user gripping the assist handle, a communication link operatively for communicating the sensed signal, and a controller controlling one or more vehicle devices based on the sensed signal, wherein the controller determines a rough road condition based on the sensed signal and adjusts the one or more vehicle devices based on the determined rough road condition.

Embodiments of the second aspect of the disclosure can include any one or a combination of the following features:
- the connector is releasable to allow for assembly and disassembly of the assist handle assembly to the vehicle;
- a jumper harness for releasably connecting to a vehicle power supply;
- the vehicle function comprises at least one of adjusting a seat device;
- the seat device comprises at least one of a seat belt, a seat belt bolster, and a seat air bladder;
- the vehicle function comprises at least one of adjusting vehicle suspension shocks;
- the communication link comprises a wireless communication link, and wherein the wireless communication link is configured to communicate with a controller onboard the vehicle; and
- the one or more proximity sensors comprises one or more capacitive sensors.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
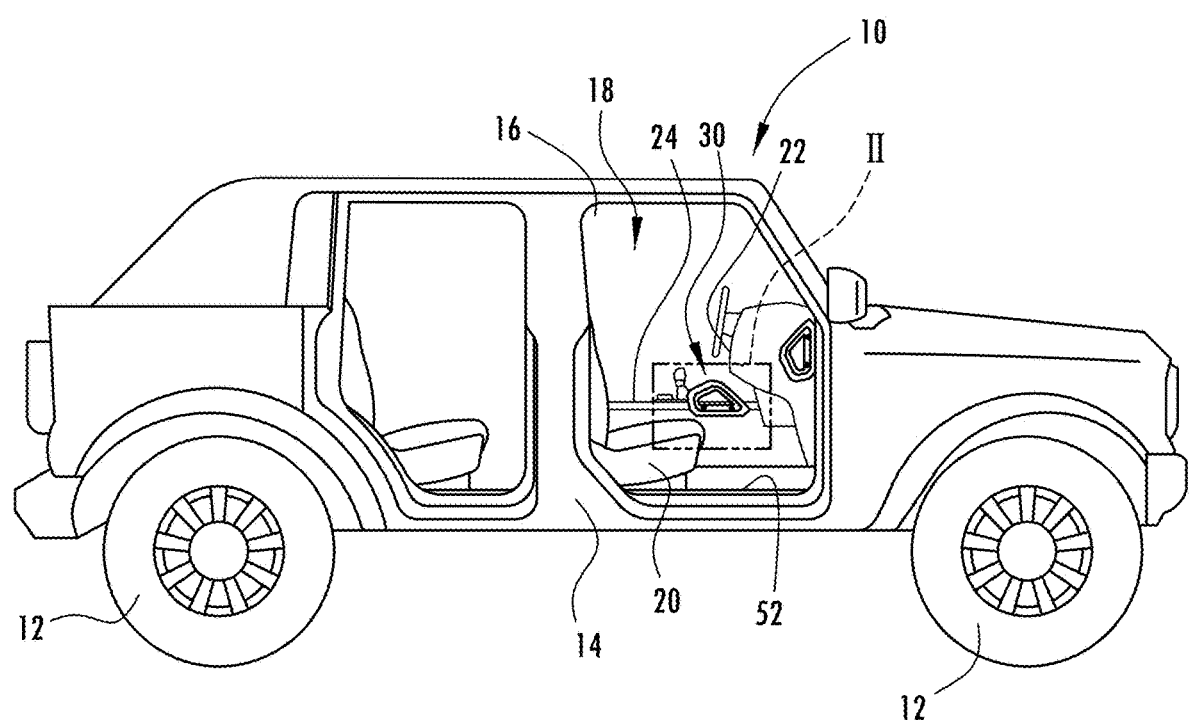
FIG. 1 is a side perspective view of a motor vehicle that is configured to include one or more assist handle assemblies.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle assist handle assembly and controls. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-5, a vehicle assist handle assembly 30 is generally illustrated assembled onto a vehicle 10. The assist handle assembly for a vehicle including an assist handle configured to be gripped by a user, a proximity sensor assembly to sense a user grabbing the assist handle, and a controller controlling one or more vehicle devices based on a user grabbing the assist handle.

With particular reference to FIG. 1, one example of a motor vehicle 10 is generally illustrated. The motor vehicle 10 is generally shown as an off-road style, wheeled vehicle that may be driven on a roadway or driven off-road on various types of terrain. The motor vehicle 10 generally includes a plurality of road wheels 12 and a vehicle body 14 generally defining a passenger compartment 18 with ingress/egress openings 16 which may be closed with doors. The doors may include hingedly connected door panels with windows or crossbars having exposed openings that may be fixedly installed or removable, according to various examples. While a wheeled vehicle is generally shown and described herein, it should be appreciated that other vehicles such as boats, trains, planes and other vehicles may be equipped with the assist handle assembly 30.

The motor vehicle 10 is configured to include one or more seats 20 for holding passengers seated within the passenger compartment 18 of the vehicle 10. In a typical passenger vehicle seating arrangement, a front row of bucket seats may include two seats spaced apart and the second row may have a bench seat configuration that may include a row of three seats or may include two seats separated by a rear center console. The front row seats 20 are generally rearward of a dashboard 22. A front center console 24 is shown located centrally within the front row of seats 20 between a driver seat and a passenger seat. The center console 24 may be configured with storage compartments, drink holders and other features. An assist handle assembly 30 is shown connected to the center console 24, according to one embodiment.

Figure 2:
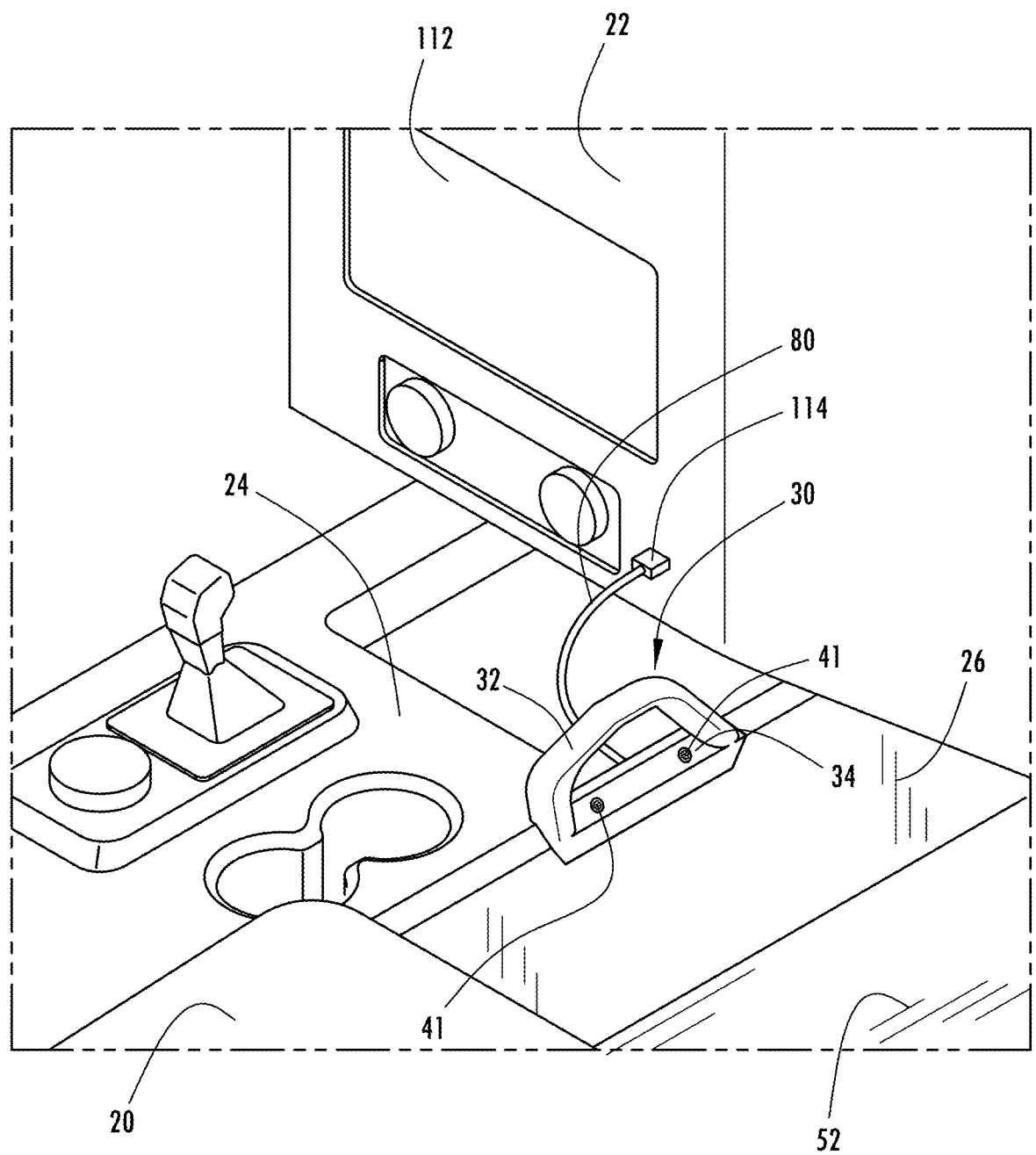
FIG. 2 is a right side perspective view of the interior of the vehicle illustrating an assist handle assembly having proximity sensors and located near a center console of the vehicle, according to one embodiment.

Referring to FIG. 2, the assist handle assembly 30 is shown assembled onto a passenger side of the center console 24 proximate an upper side of a side wall 26 and positioned to enable a passenger seated on seat 20 to engage and grip the assist handle assembly 30 with a hand for support while entering the vehicle and while traveling in the vehicle 10. For example, when the vehicle 10 is traveling off-road on rough terrain, a passenger seated on the passenger seat 20 may grip the assist handle assembly 30 for purposes of maintaining balance and stability. While the assist handle assembly 30 is shown located on the passenger or right side of the center console 24, according to one example, it should be appreciated that the assist handle assembly 30 may be located on the driver or left side of the center console 24, on the vehicle body side of a passenger seat, in the rear row of seating such as on a rear center console or at other locations within the vehicle 10, according to further examples.

The assist handle assembly 30 includes a handle base 34 that connects to the center console 24 and an assist handle 32 designed to receive and support a user's hand gripped thereto. The handle base 34 is connected to the center console 24 via an underlying bracket and fasteners 41 as shown and described herein. The assist handle assembly 30 serves as an assist handle and has a sensor arrangement for sensing a user gripping the handle indicative of a rough road condition. A touch screen display 112 is located in a dashboard 22 generally forward of and viewable by the driver and passenger.

Figure 3:
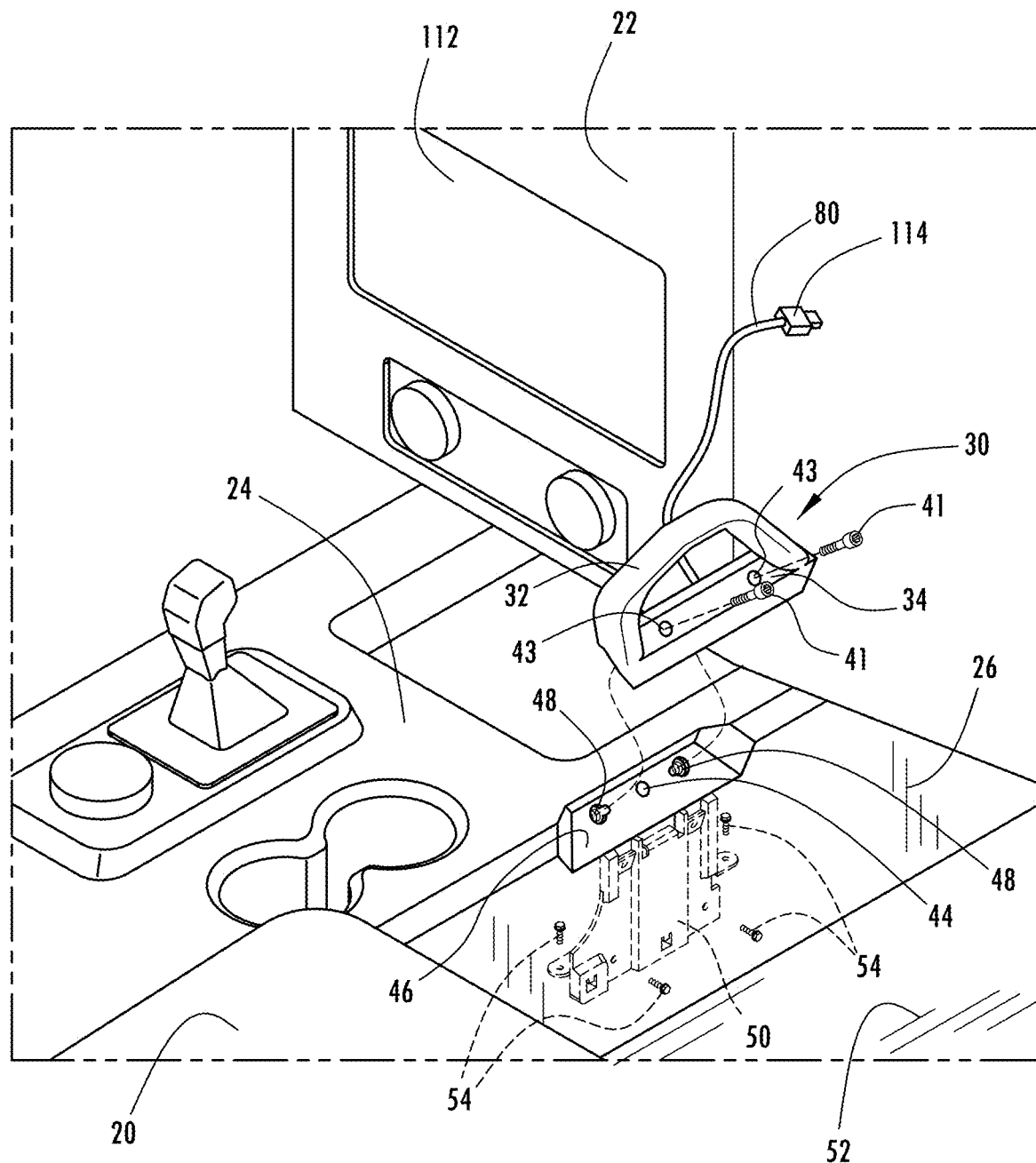
FIG. 3 is an exploded view of the assist handle assembly showing the mounting arrangement onto the center console of the vehicle.

The assist handle assembly 30 is shown in an unassembled state in FIG. 3 for mounting onto a bracket 50 in the center console 24. A pair of threaded fasteners, such as screws 41, extend through openings 43 within the handle base 34 and into threaded recesses 48 in the top plate 46 of bracket 50. The bracket 50 may, in turn, extend to a rigid support structure component such as a vehicle floor 52 where the bottom end of the bracket 50 may be fastened to the floor 52 via threaded fasteners 54. As such, the assist handle assembly 30 is rigidly attached onto the bracket 50 which is fixedly supported by a rigid floor structure component of the vehicle 10 to allow the assist handle 32 to withstand forces experienced during normal use of the assist handle assembly 30.

Figure 4:
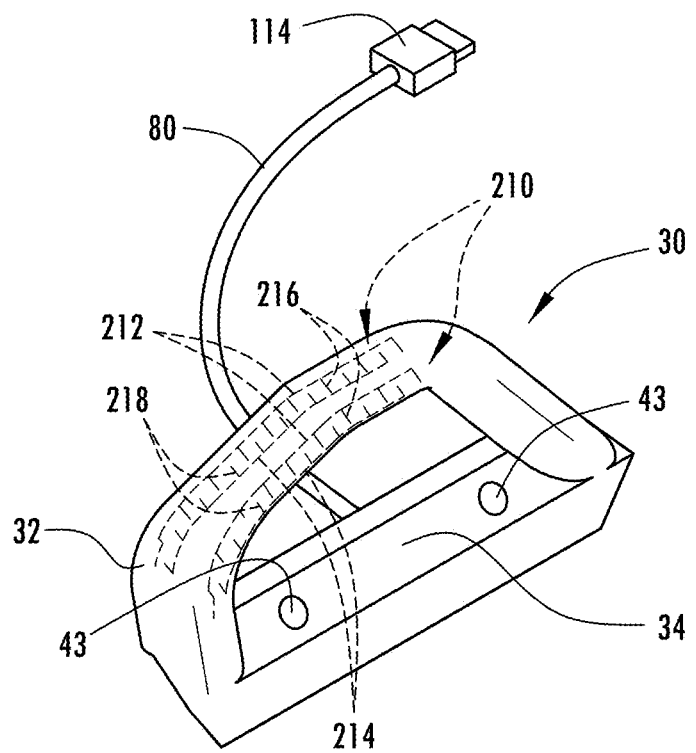
FIG. 4 is an enlarged right side perspective view of the assist handle assembly having the proximity sensors.
Figure 5:
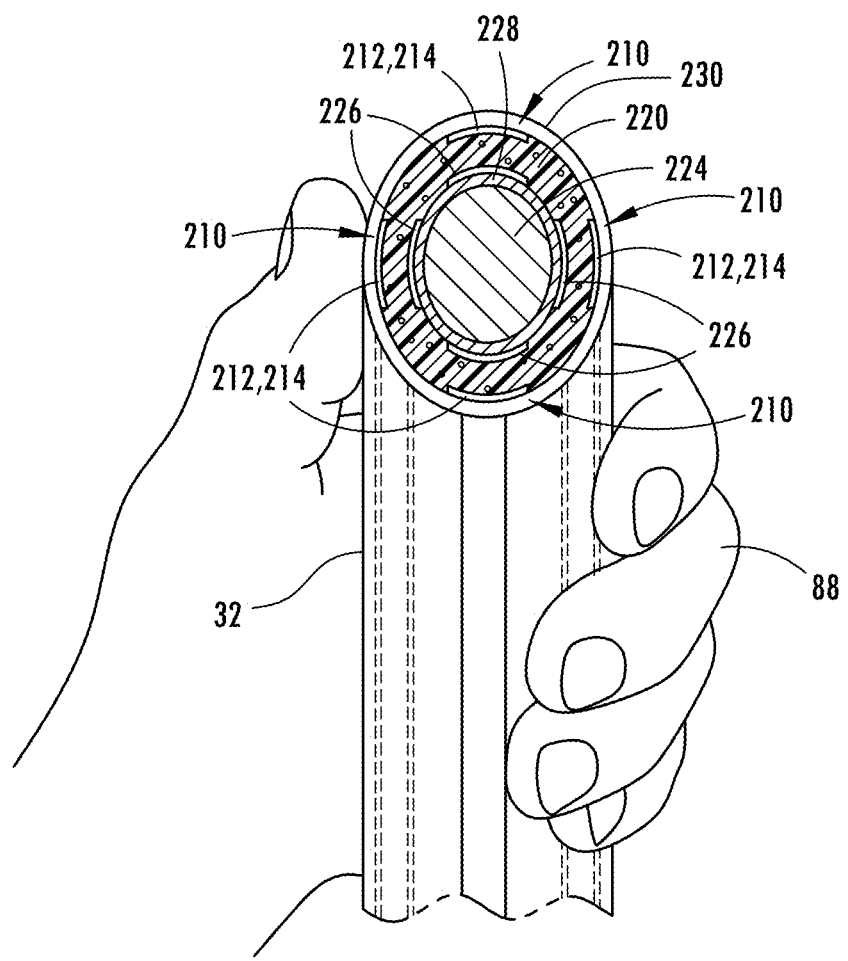
FIG. 5 is a perspective cross-sectional view taken centrally in a transverse direction through the handle further illustrating the proximity sensors.

The assist handle assembly 30 is illustrated in FIGS. 4 and 5 having four proximity sensors 210 located on the handle. One or more proximity sensors 210 may be employed on the assist handle 32. The one or more proximity sensors 210 may include one or more capacitive sensors that use capacitive sensing to sense an object, such as the hand of a user in close proximity to the assist handle 32. Each capacitive sensor may include a first electrode 212 having a first plurality of fingers 216 and a second electrode 214 having a second plurality of fingers 218. The first plurality of electrode fingers 216 may be interdigitated with the second plurality of electrode fingers 218.

The proximity sensor 210, when embodied as a capacitive sensor, may generate a sense activation field to sense contact or close proximity (e.g., within 3 mm) of a user in relation to the proximity sensor. The sense activation field of the proximity sensor 210 is a capacitive field in the exemplary embodiment and the user's hand has electrical conductivity and dielectric properties that cause a change or disturbance in the sense activation field as should be evident to those skilled in the art. However, it should be appreciated by those skilled in the art that additional or alternative types of proximity sensors can be used, such as, but not limited to, inductive sensors, optical sensors, temperature sensors, resistive sensors, the like, or a combination thereof. The proximity sensor 210 may be printed as a conductive ink onto a substrate such as an inner surface of a covering of the grab handle 32 or may be assembled as a preformed conductive circuit trace. One of the first and second electrodes 212 and 214 operates as a drive electrode and may receive square wave drive pulses applied at a voltage. The other of the first and second electrodes 212 and 214 operates as a receive electrode and has an output for generating an output voltage. It should be appreciated that the first and second electrodes 212 and 214 may be arranged in various other configurations for generating the capacitive field.

Each capacitive sensor 210 may sense contact or close proximity of an object, such as a user's hand, gripping the assist handle 32. This may allow for a controller in the vehicle to temporarily tighten or lock a seat belt of a passenger when the assist handle 32 is fully grabbed by the hand 88 of passenger or when the grip by the hand 88 on the assist handle tightens. Additionally, the proximity sensor 210 may detect engagement of the assist handle 32 by a person when the owner or potential passenger(s) are located remote from the vehicle, such as may be determined by a key fob or other sensor, and therefore may serve as a theft deterrent and/or may output a theft alarm. It should further be appreciated that one or more proximity sensors 210, such as capacitive sensors may likewise be employed in the assist handle 32. It should be appreciated that other features or devices may be controlled based on the output of the proximity sensor 210.

The assist handle assembly 30 further includes a power cable 80 for connecting to a vehicle power supply and ground to supply electrical power to the capacitive sensors 210 and wireless communication circuitry. The power cable 80 may have a releasable connector 114 such as a plug-in-connector, e.g., USB connector or a cigarette lighter connector, for supplying electrical power supply and ground connection. A user may plug the power cable connector 114 into a power supply connector on the vehicle 10. The handle base 34 also includes an opening 44 to enable the power cable 80 to be extended through the opening 44 to allow a hidden electrical connection within the center console 24. This may be achieved by using a jumper harness as the power cable 80 to plug into power and ground and may also connect to a vehicle controller area network (CAN) bus on the vehicle 10 which may provide power and data communication between the vehicle 10 and the assist handle assembly 30. The capacitive sensors 216 may communicate sensed signals with a vehicle controller via the CAN bus or via wireless communication such as RF Bluetooth®.

Referring to FIG. 5, a portion of the ring-shaped handle 32 of the assist handle assembly 30 is generally illustrated partially assembled so as to illustrate the various layers of the handle 32 and proximity sensors 210. The handle 32 includes a rigid core 224 which is shown in a generally cylindrical cross-sectional shape which may be made of magnesium or aluminum, according to some examples. The core 224 provides structural support and shape to the handle 32. Surrounding the core 224 is a compliant layer 220 that may be made of polyurethane or foam. The compliant layer 220 may have a generally cylindrical shape and provides compressibility with memory that allows for a soft or cushioned feel to the handle 32. The compliant layer 220 and core 224 together provide a core structure of the handle 32. The capacitive sensors 210 are shown located on top of the compliant layer 220. Disposed over the complaint layer 220 and capacitive sensors 210 is a cover layer 230, such as a polymeric or leather cover.

As shown in FIGS. 4 and 5, the capacitive sensor 210 is shown provided on four sides about the circumference of the handle 32 of the assist handle assembly 30. As seen, the capacitive sensors 210 include four capacitive sensors provided on a front side, a rear side, a top side, and a bottom side. As such, a user's hand 88 may be detected on the front, top, back and bottom sides of the handle 32 of the assist handle assembly 30 by using all four sensors positioned on each of the four sides. It should be appreciated that the proximity or touch of the user's hand on one or more of the capacitive sensors may be detected and that the user's hand may squeeze and pressure applied thereto may be detected with the capacitive sensors 210. Each of the capacitive sensors may be configured as shown and described herein.

Figure 6:
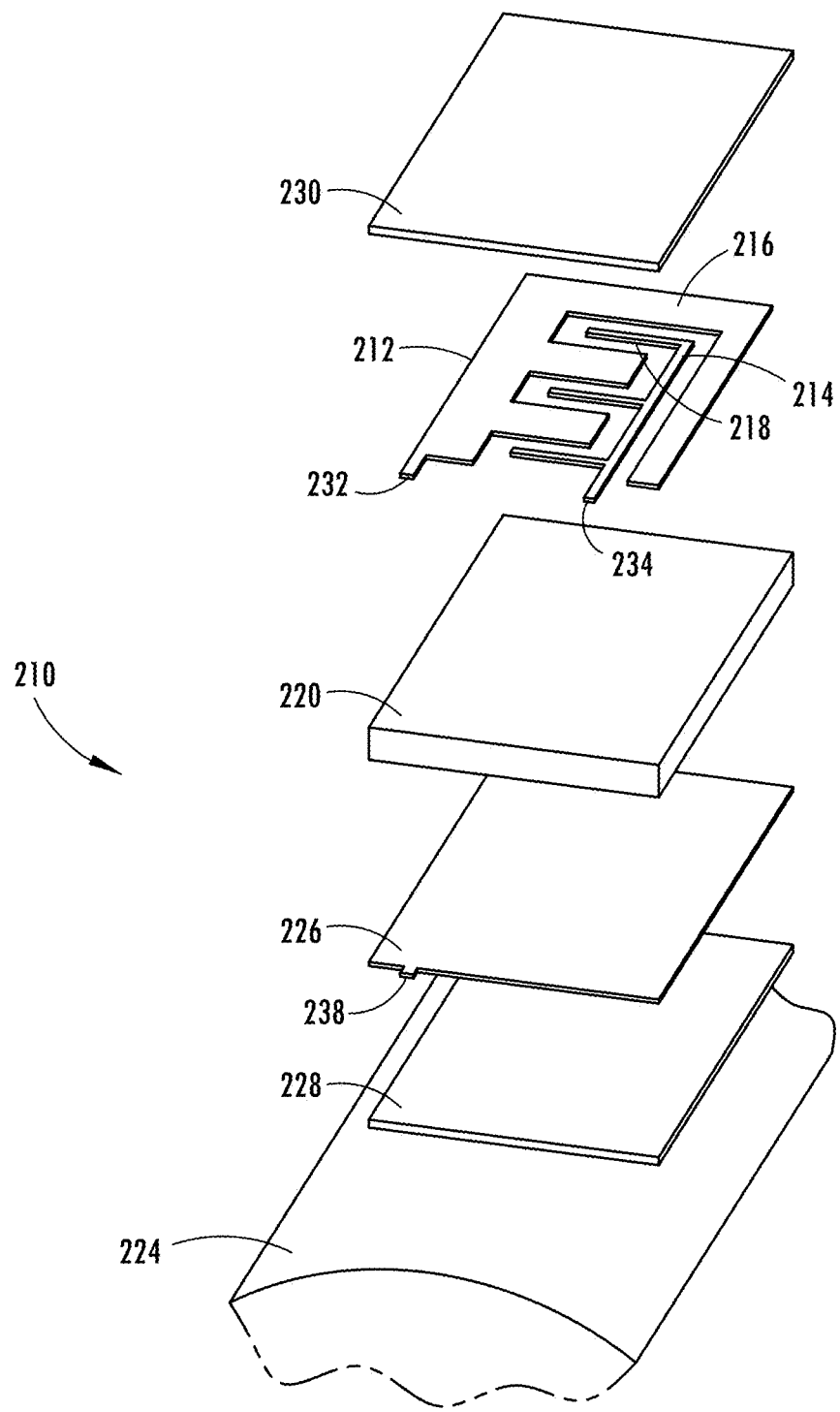
FIG. 6 is an exploded upper front perspective view of a capacitive proximity sensor assembly, according to one embodiment.

A capacitive proximity sensor 210 representation of each of sensors 210 is shown in FIG. 6, according to one embodiment. The proximity sensor includes three electrodes configured to operate in different sensor modes or states by using a controller to reconfigure the input and output sampling of the signals generated by the various electrodes to operate in different sensor configurations to provide up to three capacitive sensors that may operate as a mutual capacitive sensor or a self-capacitive sensor and to sense input commands, such as touch, proximity and pressure (force/area) or force.

The arrangement of the electrodes in the capacitive proximity sensor 10 illustrated in FIG. 6 has first and second capacitive electrodes 212 and 214 arranged within a common layer and dielectrically isolated from one another via a separation distance. The first electrode 212 has a first plurality of conductive fingers 216 and the second electrode 214 has a second plurality of conductive fingers 218. The first plurality of conductive fingers 216 are interdigitated or interleaved with the second plurality of conductive fingers 218. As a result, the first and second electrodes 212 and 214 may operate in a first mode as a mutual capacitance sensor when one of the electrode signal terminals 232 and 234 is driven with a drive signal and the other of the electrode signal terminals 232 and 234 generates a receive signal when operated in a mutual capacitance mode. When one of the electrode signal terminals 232 and 234 receives a drive signal, that electrode operates as a drive electrode and the other electrode operates as a receive electrode. The drive electrode may receive square wave drive pulses applied at a voltage $V_I$. The receive electrode may have an output for generating an output voltage $V_O$. It should be appreciated that the first and second electrodes 212 and 214 may be arranged in various other configurations for generating a capacitive electric field as an activation field.

In the mutual capacitance sensor mode, the drive electrode is applied with voltage input $V_I$ as square wave pulses having a charge pulse cycle sufficient to charge the receive electrode to a desired voltage. The receive electrode thereby serves as a measurement electrode. When a user or operator, such as a user's finger, enters the activation electric field generally proximate the top front side of the proximity sensor 210, the proximity sensor 210 detects the disturbance caused by the finger to the activation electric field and determines whether the disturbance is sufficient to detect a touch input sufficient to activate a proximity switch or generate a desired output. The disturbance of the activation electric field is detected by processing the charge pulse signal associated with the corresponding signal.

An overlying dielectric cover 230 is provided on the top front side of the first and second electrodes 212 and 214 to provide dielectric isolation and protection of the first and second electrodes 212 and 214. The dielectric cover 230 may include any dielectric materials, such as a dielectric polymer or plastic, leather, a trim component or other dielectric medium. It should be appreciated that the first and second electrodes 212 and 214 may be formed by printing conductive ink in the desired patterns of the electrodes. The ink may be printed on the rear surface of the dielectric cover 230, according to one embodiment or may be printed on the front surface of the dielectric layer 220 therebelow. The first and second electrodes 212 and 214 may otherwise be formed by placing preformed conductive electrodes between the dielectric cover 230 and the compliant dielectric layer 220.

Disposed below the first and second electrodes 212 and 214 is the compliant dielectric layer 220. The compliant dielectric layer 220 has a relatively soft material that is compliant and deformable when pressure, which is force applied over an area, is applied to the front of the cover 230 so as to squeeze and deform the first compliant dielectric layer 220. According to one example, the compliant dielectric layer 220 may be a soft foam material.

Located below the compliant dielectric layer 230 is a third electrode 226. The third electrode 226 is shown formed as a sheet of conductive material, according to one embodiment. The third electrode 226 has a signal terminal 238 to allow for communication of signals with the controller. The third electrode 226 may operate in one sensor mode as a mutual capacitive sensor that detects pressure applied to the top front surface which causes deformation of the compliant dielectric layer 220. As the compliant dielectric layer 220 is squeezed due to pressure and deforms, at least a portion of the pair of the first and second electrodes 212 and 214, which may be shorted together to form a single electrode or operated individually, moves towards the third electrode 226. When this occurs, the controller detects the relative position of the pair of first and second electrodes 212 and 214 relative to the third electrode 226. In other sensor modes, the third electrode 226 may be open circuited to operate as a shield for the first and second electrodes 212 and 214 located thereabove or the third electrode 226 located therebelow. When operated as a shield, the third electrode 226 may be open circuited such that there is no applied voltage applied or may be driven to a desired voltage, according to various embodiments.

A further bottom dielectric layer 228 is shown provided below the third electrode 226 so as to dielectrically isolate the third electrode 226 on the bottom side. In one embodiment, the bottom dielectric 228 may be a dielectric backing material.

Figure 7:
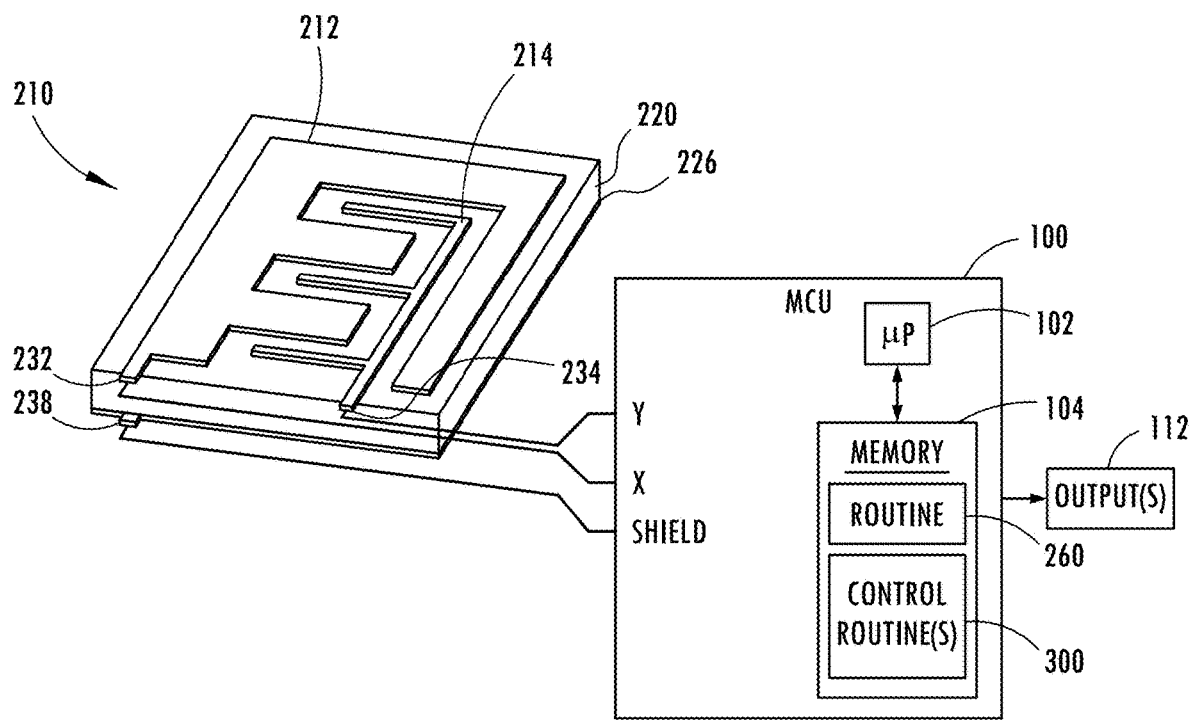
FIG. 7 is a front perspective view of the capacitive proximity sensor shown in FIG. 6 with a controller configured to sample signals in a first sensor mode.
Figure 8:
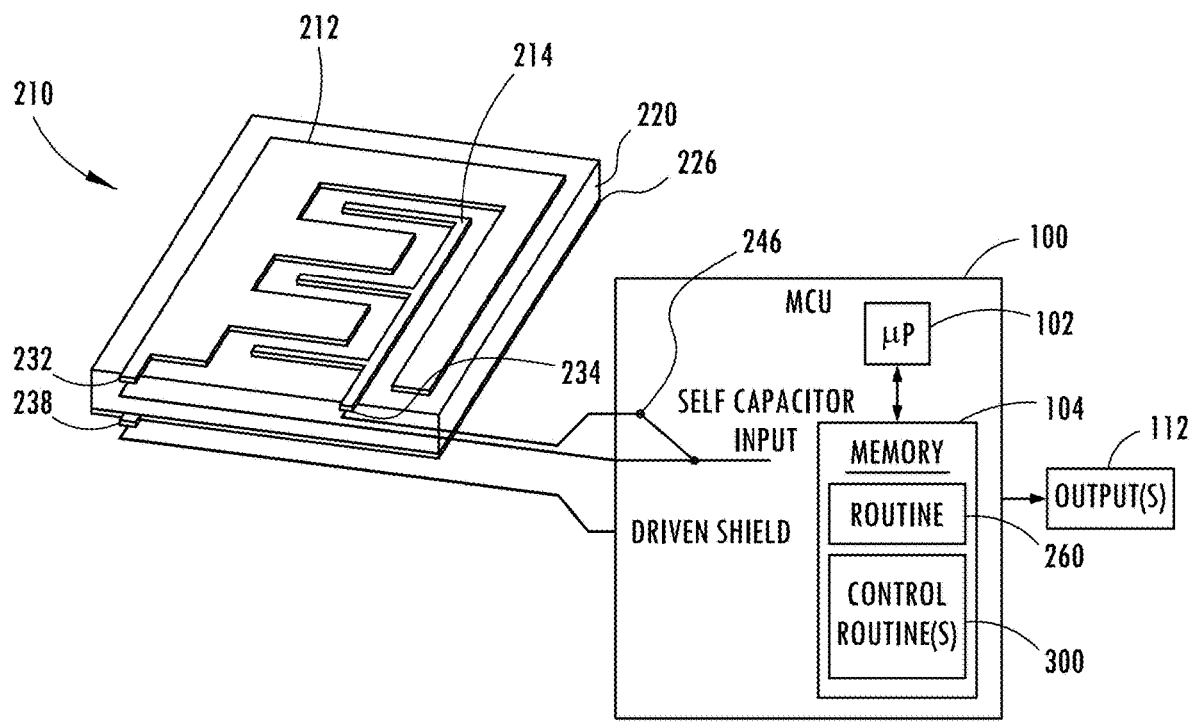
FIG. 8 is a front perspective view of the capacitive proximity sensor shown in FIG. 6 with the controller configured to sample signals in a second sensor mode.
Figure 9:
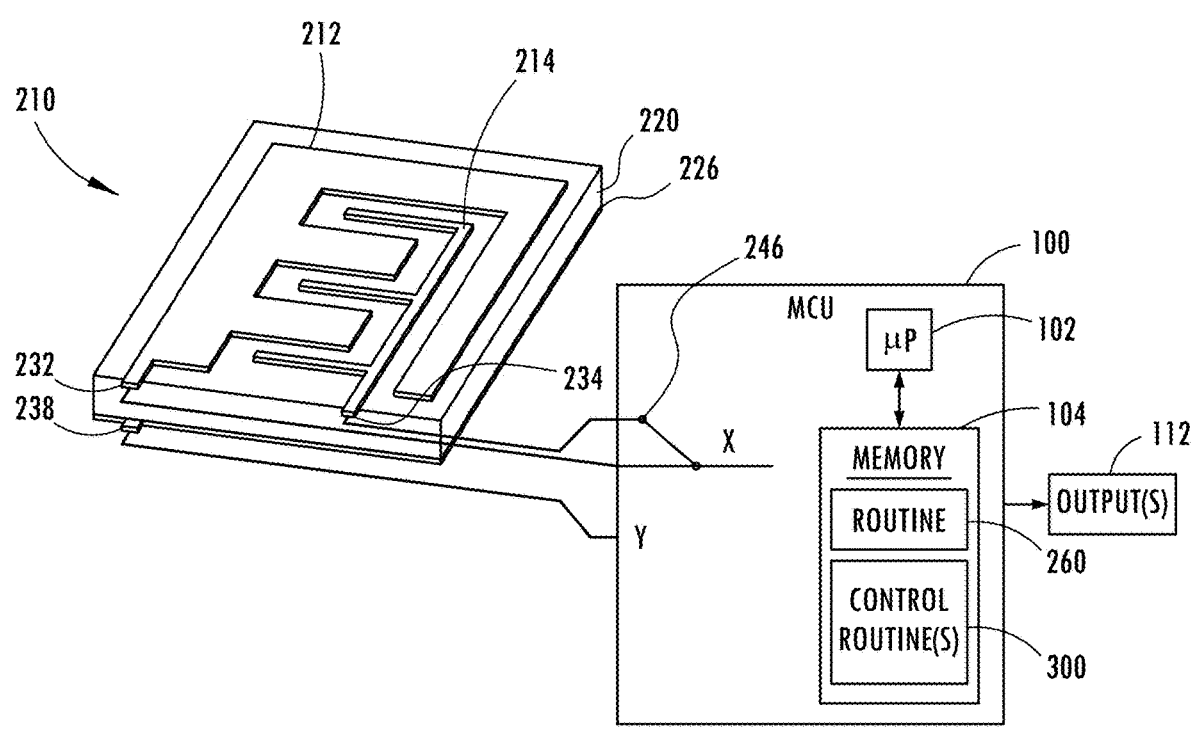
FIG. 9 is a front perspective view of the capacitive proximity sensor shown in FIG. 6 with the controller configured to sample signals in a third sensor mode.

Referring to FIGS. 7-12, the various operating sensor modes of the electrode configurations as controlled by a controller 100 are illustrated for one embodiment of one of the sensors of the capacitive proximity sensor 210. As best seen in FIGS. 7-9, the controller 100 may include a microprocessor 102 and memory 104 configured with one or more routines 300. The controller 100 may be a micro control unit (MCU) having firmware, according to one example. It should be appreciated that other analog and/or digital circuitry may be used to provide the controller 100. The controller 100 includes various inputs/outputs including three inputs/outputs connected to the respective signal terminals 232, 234 and 238 associated with the first, second and third electrodes 212, 214 and 226. Additionally, the controller 100 may generate one or more outputs 112 based on the sensed signals. For example, the controller 100 may provide proximity sensor outputs based on the proximity sensing such that the capacitive proximity sensors 210 operates as one or more capacitive proximity switches, according to various examples.

Figure 10:
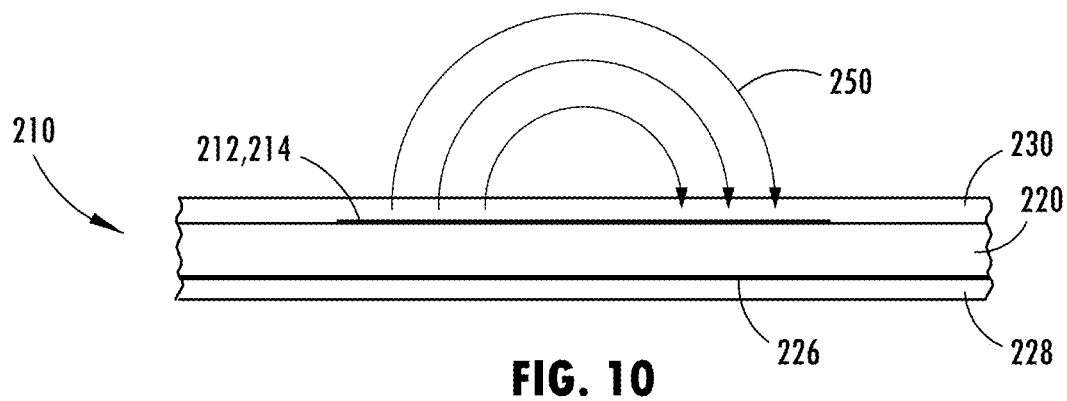
FIG. 10 is a cross-sectional view of the capacitive proximity sensor of FIG. 6 further illustrating the electric field generated in the first sensor mode.

Referring to FIGS. 7 and 10, the proximity sensor 210 is configured according to a first sensor mode in which the first and second electrodes 212 and 214 form a mutual capacitance with each other to serve as a first sensor that may be used to sense touch or close proximity of a user at or near the top front surface of cover 230. In this sensor mode, the third electrode 226 is open-circuited via the controller 100 so as to form a conductive shield that may enhance the mutual capacitance between the first electrode 212 and second electrode 214. The first electrode 212 may receive a drive signal X and the second electrode 214 may supply a receive signal Y. As seen in FIG. 10, the activation electric field is generated due to a mutual capacitive coupling of the first and second electrodes 212 and 214 as illustrated by arrows 250 to enable the detection of touch or movement, e.g., swipe, on or above the front cover 230 (e.g., within 30 millimeters).

Figure 11:
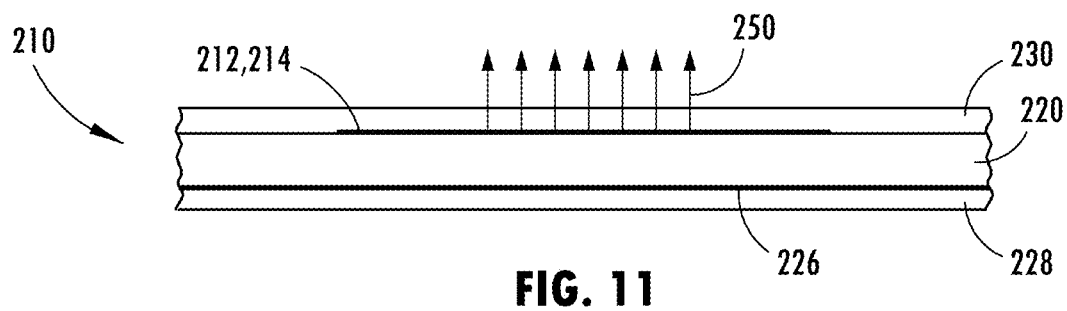
FIG. 11 is a cross-sectional view of the capacitive proximity sensor of FIG. 6 further illustrating the electric field generated in the second sensor mode.

The controller 100 may sequentially switch the capacitive proximity sensor assembly 10 amongst the various sensor modes at a rapid speed simply by changing the inputs and outputs and thereby reconfiguring the sensing arrangement to sequentially provide first, second and third sensors. Referring to FIGS. 8 and 11, the capacitive proximity sensor 210 is shown in the second sensor mode in which the first and second electrodes 212 and 214 are electrically shorted together to form a single electrode, and the third electrode 226 is driven to a desired voltage to provide a shield. To electrically short the first and second electrodes 212 and 214 together, the controller 100 may include a switch 246 that may be implemented in firmware or otherwise implemented with an analog or digital switch. In this sensor mode, the first and second electrodes 212 and 214 which are shorted together receives a self-capacitor input to generate an activation electric field illustrated by arrows 250 to form a self-capacitive second sensor as seen in FIG. 11 in which the activation electric signal may detect objects above the top front cover 230 at an extended distance (e.g., a distance up to 30 centimeters). The self-capacitor input may apply a voltage for half of a cycle to charge the electrode and may sense capacitance during the other half of the cycle.

Figure 12:
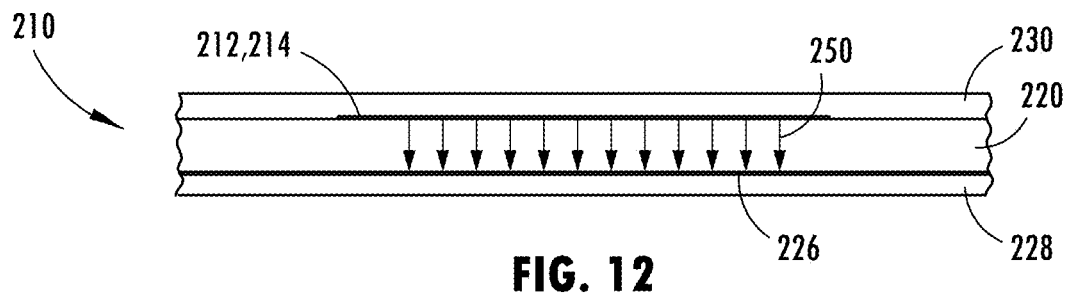
FIG. 12 is a cross-sectional view of the capacitive proximity sensor of FIG. 6 further illustrating the electric field generated in the third sensor mode.

Referring to FIGS. 9 and 12, the capacitive proximity sensor 210 is illustrated in the third sensor mode in which the first and second electrodes 212 and 214 are electrically shorted together via the switch 246 as controlled by controller 100 and receive the drive signal X, and the third electrode 26 supplies the receive signal Y. It should be appreciated that the short-circuited first and second electrodes 212 and 214 may receive the drive signal X to form a mutual capacitance with the third electrode 226 to provide a third sensor. As such, movement of the shorted together first and second electrodes 212 and 214 relative to third electrode due to compression of the compliant dielectric layer 220 may be detected as an indication of the amount of force or pressure applied to the front surface of the cover 230. The activation electric field between the shorted-circuited first and second electrodes 212 and 214 and the third electrode 226 is illustrated by arrows 250 in FIG. 12.

Accordingly, it should be appreciated that the controller 100 may sequentially switch between the first, second and third sensor modes as illustrated in FIGS. 7-12 at a rapid pace so as to sequentially configure the capacitive proximity sensor 210 in various sensor configurations referred to as first, second and third sensors and sample sensed signals to sense a sensed condition in each sensor mode. This may be achieved by the controller 100 switching the drive signal X and the receive signal Y between the various inputs and outputs and sampling the signals over a short period of time such as 20 milliseconds and then switching sequentially to the next sensor mode, repeatedly. As such, multiple sensors may be realized with the capacitive proximity sensors 210. The sensor signals may be compared to threshold values to act as switches to trigger an output response. The sensor functions associated with one or more of each of the sensor modes may be used to detect user inputs for each proximity sensor 210.

Figure 13:
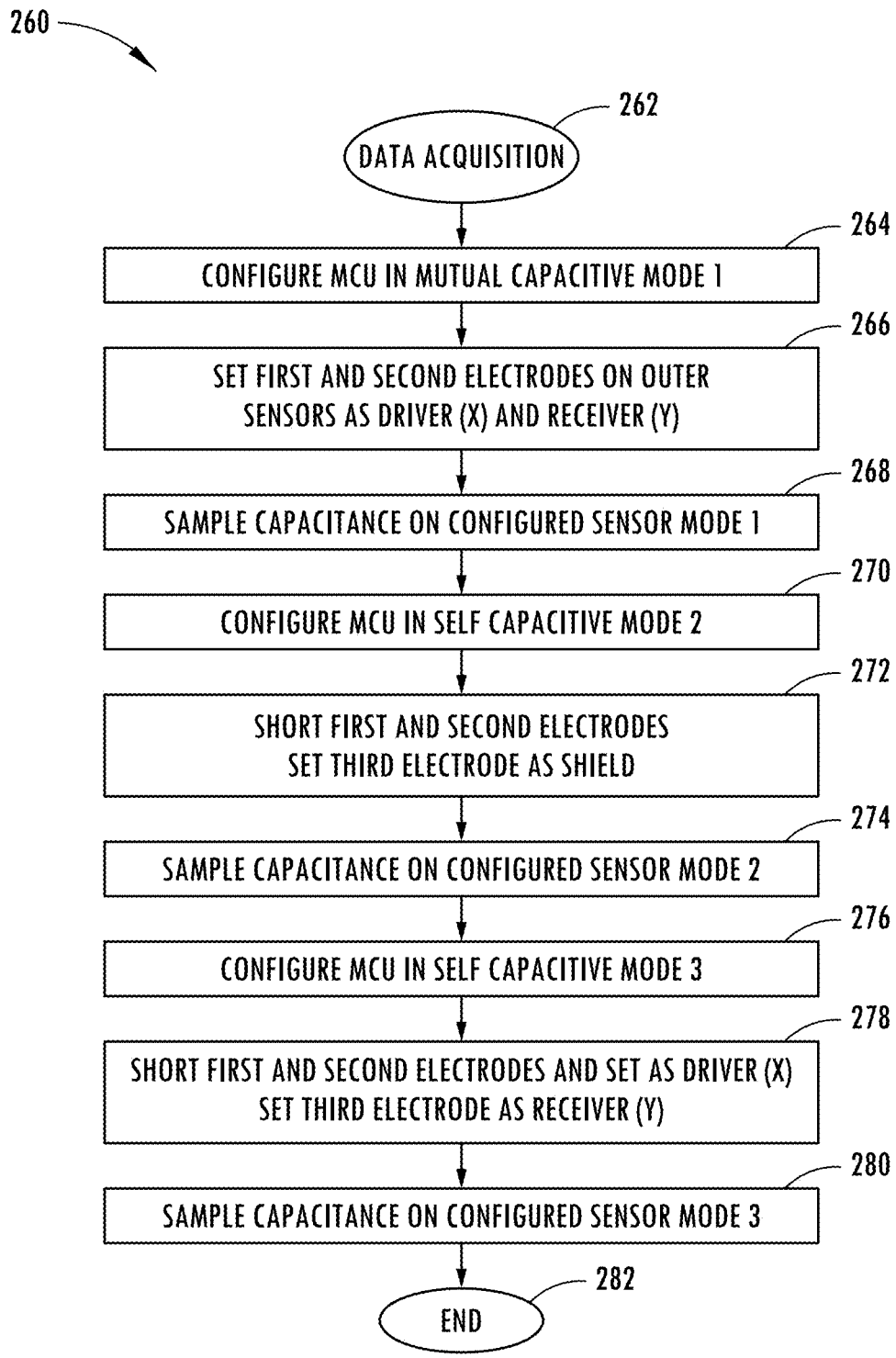
FIG. 13 is a flow diagram illustrating a routine for switching amongst the first, second and third sensor modes.

Referring to FIG. 13, a routine 260 for controlling the controller 100 to sequentially switch the capacitive proximity sensor 210 amongst the various operating modes is illustrated, according to one embodiment. The routine 260 is shown for operating the capacitive proximity sensor assembly 210 according to the first embodiment in each of sensor modes 1-3. It should be appreciated that the routine 260 may be executed by the microprocessor 102 in the controller 100 and that the routine 260 may be stored in memory 104. The routine 260 may sample data and reconfigure each capacitive proximity sensor 210 in the various modes at a sampling rate of about 20 milliseconds, according to one example. It should be appreciated that other sampling rates may be employed.

Routine 260 begins at step 262 to acquire data and then proceeds to step 264 to configure the controller in a first mutual capacitance sensor mode 1. In sensor mode 1, routine 260 proceeds to step 266 to set the first electrode with the drive signal X and to set the second electrode with the drive receive signal Y, and may set the third electrode as a shield. Thereafter, routine 260 proceeds to step 268 to sample the capacitance on the configured mutual capacitance sensor in sensor mode 1. Sensor mode 1 may sense touch commands which may be used to perform a function such as displaying information and activating certain devices such as lighting devices.

Next, routine 260 proceeds to step 270 to configure the controller in a self-capacitance sensor mode 2. In mode 2, routine 260 proceeds to step 272 to electrically short-circuit the first and second electrodes together, and to set the third electrode as a shield. The shorted together first and second electrodes receive a self-capacitance input signal. Next, at step 274, routine 260 samples the capacitance of the configured self-capacitance sensor in sensor mode 2. Sensor mode 2 may be used to determine detection of an object proximate to the sensor.

Next, routine 260 proceeds to step 276 to configure the controller in a mutual capacitance sensor mode 3. This includes electrically short-circuiting the first and second electrodes together and setting the combined first and second electrodes with the drive signal X, and setting the third electrode with the receive signal Y in step 278. Next, in step 280, the capacitance of the configured mutual capacitance sensor in sensor mode 3 is sampled before ending at step 282. Sensor mode 3 may detect pressure applied by a user to the handle while gripping the handle and may be used to command a function different from a user touch command.

It should be appreciated that the routine 260 may be repeated sequentially at a rapid pace, such that the sampling between the execution of the sensor configurations in modes 1, 2 and 3 may occur at a sampling rate of 20 milliseconds, for example. As a result, each capacitive proximity sensor 210 is able to operate sequentially in multiple modes with different configurations of capacitive sensors to sense various signals, particularly objects and input commands in four sensor modes pursuant to the first embodiment.

Figure 14:
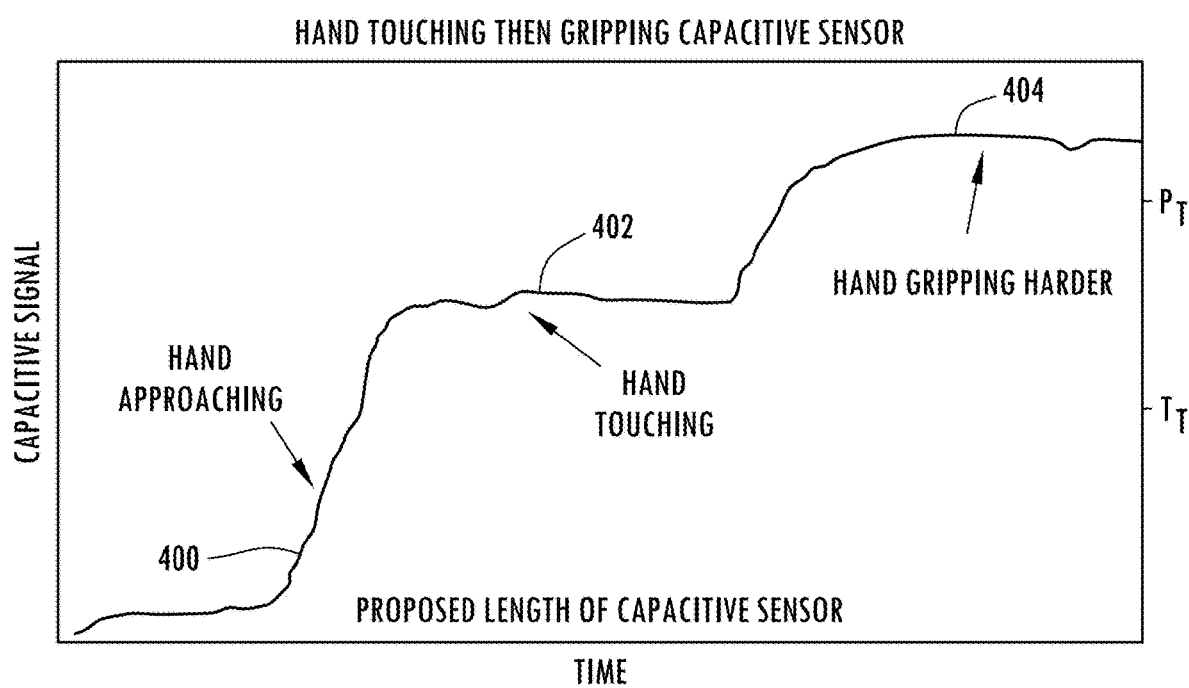
FIG. 14 is a graph illustrating one example of a capacitive proximity sensor signal processed to detect touch and pressure.

One example of the sensed signal 400 generated by the proximity sensor is illustrated in FIG. 14. Sensed signal 400 increases when a hand approaches the proximity sensor and reaches level 402 with a touch value greater than a touch threshold when the hand touches the handle. The sensed signal 400 further increases to level 4040 when a pressure grip value is greater than a pressure threshold PT is reached when the hand grips the handle with a sufficient pressure which may indicate a rough road condition.

Figure 15:
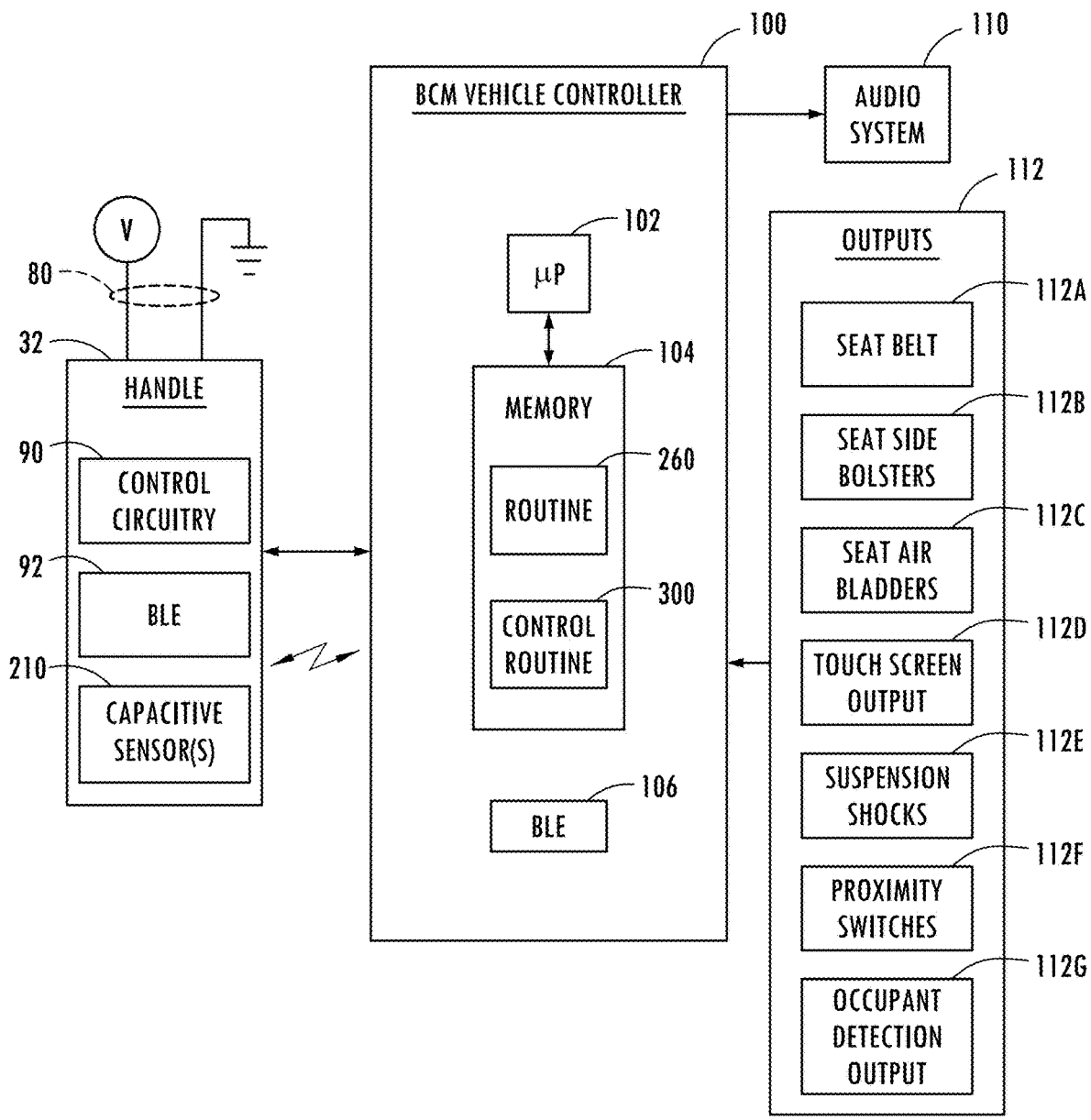
FIG. 15 is a block diagram illustrating communication of a vehicle controller with the proximity sensors and the control outputs, according to one example.

Referring to FIG. 15, a vehicle controller 100, such as a body control module (BCM) may communicate with the proximity sensors 210 and may control various vehicle related functions. The vehicle controller 100 receives signal inputs from each of the capacitive sensors 210 and may further receive signals from a wireless communication device 92 shown as a Bluetooth® low energy (BLE) device located in the handle 32. The wireless communication device 92 ay further communicate with control circuit 90 in the handle 32. Additional inputs may include vehicle operating conditions such as speed, pitch, roll angle, acceleration inputs such as rough road, according to various examples. The sensed signal indicative of a user gripping the assist handle may be indicative of a rough road condition and may be used to adjust vehicle related device settings for travel during a rough road condition. These and other inputs and data may be received and processed by the vehicle controller which may then be used to control one or more vehicle related functions. The vehicle related functions that may be controlled may include adjusting at least one of a seat device including the seat belt 112A by adjusting a seat belt lock or tension adjustment mechanism to increase the pull force required to extend the seat belt to thereby retain the seated passenger with the increased holding force, or seat side bolsters 112B to increase the lateral holding force to stabilize the occupant, or seat air bladders 112C to soften the seat bladder for a more comfortable rough road seating. The vehicle related functions may include providing a touch screen output 112D to show the amount of vehicle suspension travel remaining, or to adjust the suspension shocks 112E for rough road driving. The vehicle related functions may also include adjusting capacitive switch or input debounce time with proximity switches 112F and may provide an occupant detection output 112G.

Figure 16:
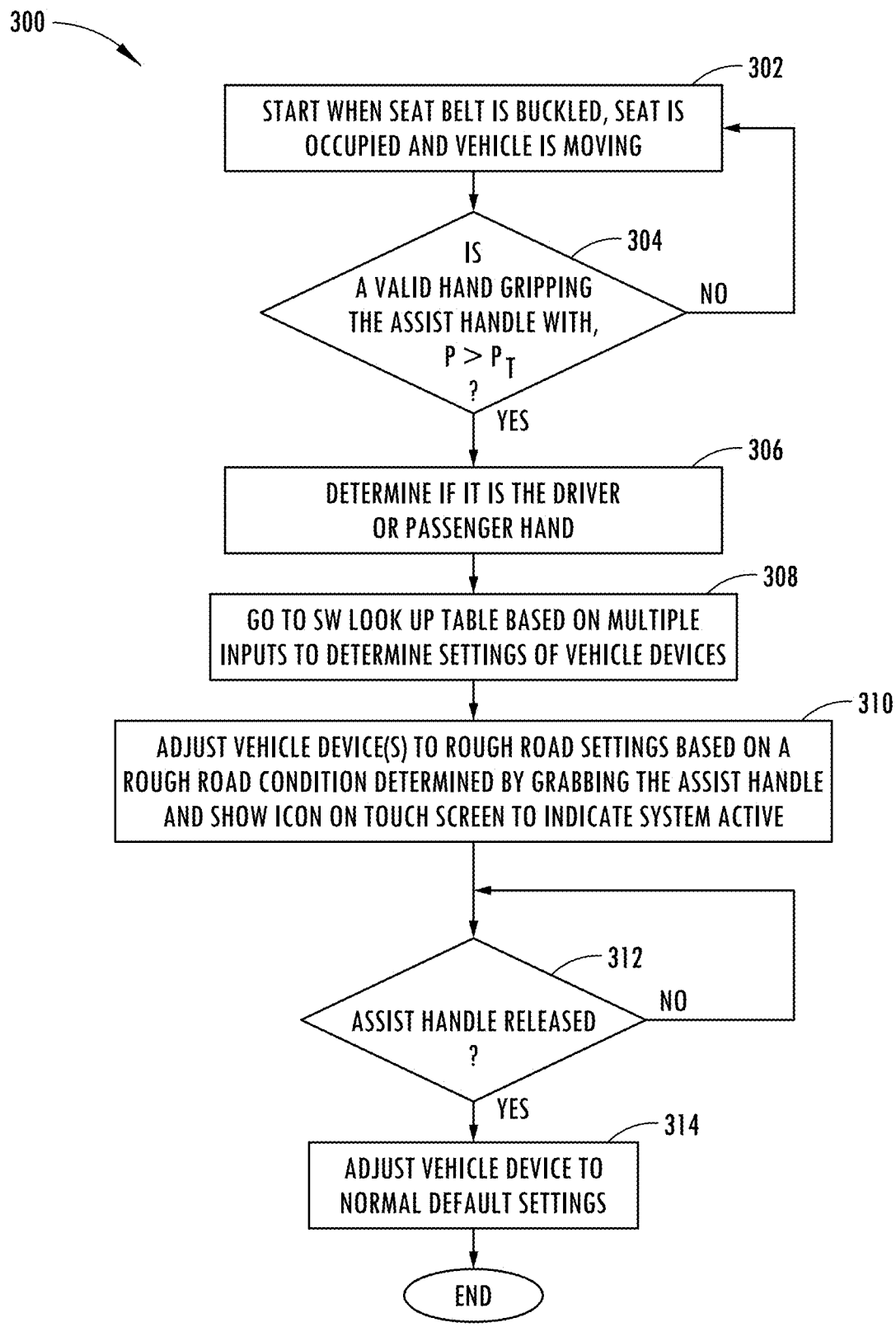
FIG. 16 is a flow diagram illustrating the control routine for controlling vehicle related devices based on sensed gripping of the handle.

Referring to FIG. 16, the control routine 300 is illustrated, according to one example. Routine 300 begins at step 302 and proceeds to start when the seat belt is buckled, the seat is occupied as detected by occupant seat sensor, and the vehicle is determined to be moving. Proceeding to decision step 304, routine 300 determines if a valid hand is gripping the assist handle with a pressure P greater than a pressure threshold PT and if not, returns to step 302. If the pressure P on the assist handle is greater than the pressure threshold PT, routine 300 proceeds to step 306 to determine if the hand is a driver's hand or a passenger hand seated on the opposite lateral side of the driver. The identification of the driver or passenger hand can be made based on the gripping position of the hand being a left or right hand as detected by the plurality of proximity sensors on the assist handle. Next, at step 308, routine 300 proceeds to look up a switch lookup table based on multiple inputs to determine the settings of vehicle devices. At step 310, routine 300 adjusts one or more vehicle related devices to rough road settings based on a rough road condition determined by the proximity sensors sensing a pressure gripping of a hand on the assist handle and shows an icon on a touch screen to indicate the system is active. Routine 300 then proceeds to decision step 312 to determine if the assist handle has been released and, if not, waits and returns to step 312. Once the grab handle has been released, routine 300 will adjust the vehicle related devices to the normal default settings at step 314 before ending at step 316.

Accordingly, the assist handle assembly 30 advantageously provides for an assist handle with a proximity sensors to sense a passenger in the vehicle gripping the assist handle 32 indicates of a rough road condition and controls one or more vehicle related devices based on the rough road condition.

It should be appreciated that the assist handle assembly 30 may be located at one or more other locations on the vehicle 10, such as on the dashboard, a door side of the vehicle, a pillar and elsewhere on the vehicle 10. The assist handle assembly 30 may be an add-on assembly that can be assembled onto the vehicle 10 by a user with the releasable connectors, e.g., fasteners that allow for easy assembly and disassembly from the vehicle 10. The assist handle assembly 30 may thereby replace another assembly such as an assist handle that does not have any accessories, for example.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An assist handle assembly for a vehicle, the assist handle assembly comprising:
   an assist handle configured to be gripped by a user;
   a connector configured to secure the assist handle assembly to a structural component of the vehicle;
   a proximity sensor assembly coupled to the assist handle for generating a sensed signal indicative of a user gripping the assist handle; and
   a controller controlling one or more vehicle functions based on the sensed signal, wherein the controller determines a rough road condition based on the signal and adjust the one or more vehicle functions based the determined rough road condition.

2. The assist handle assembly of claim 1, wherein the connector is releasable to allow for assembly and disassembly of the assist handle assembly from the vehicle.

3. The assist handle assembly of claim 2 further comprising a power cable for connecting to a vehicle power supply.

4. The assist handle assembly of claim 1, wherein the vehicle function comprises at least one of adjusting a seat device.

5. The assist handle assembly of claim 1, wherein the seat device comprises at least one of a seat belt, a seat belt bolster, and a seat air bladder.

6. An assist handle assembly for a vehicle, the assist handle assembly comprising:
   an assist handle configured to be gripped by a user;
   a connector configured to secure the assist handle assembly to a structural component of the vehicle;
   a proximity sensor assembly coupled to the assist handle for generating a sensed signal indicative of a user gripping the assist handle; and a controller controlling one or more vehicle functions based on the sensed signal, wherein the vehicle function comprises at least one of adjusting vehicle suspension shocks.

7. The assist handle assembly of claim 1 further comprising a communication link.

8. The assist handle assembly of claim 7, wherein the communication link is configured to communicate with a controller onboard the vehicle.

9. The assist handle assembly of claim 7, wherein the communication link comprises a wireless communication link.

10. The assist handle assembly of claim 1, wherein the connector is configured to connect to a bracket in an interior portion of the vehicle.

11. The assist handle assembly of claim 1, wherein the assist handle comprises one or more proximity sensors.

12. The assist handle assembly of claim 11, wherein the one or more proximity sensors comprises one or more capacitive sensors.

13. An assist handle assembly for use in an interior of a vehicle, the assist handle assembly comprising:
an assist handle configured to be gripped by a user;
a connector configured to secure the assist handle assembly to a structural component in the interior of the vehicle;
a proximity sensor assembly coupled to the assist handle for generating a sensed signal indicative of a user gripping the assist handle;
a communication link operatively for communicating the sensed signal; and
a controller controlling one or more vehicle devices based on the sensed signal, wherein the controller determines a rough road condition based on the sensed signal and adjusts the one or more vehicle devices based on the determined rough road condition.

14. The assist handle assembly of claim 13, wherein the connector is releasable to allow for assembly and disassembly of the assist handle assembly to the vehicle.

15. The assist handle assembly of claim 14 further comprising a jumper harness for releasably connecting to a vehicle power supply.

16. The assist handle assembly of claim 13, wherein the vehicle function comprises at least one of adjusting a seat device.

17. The assist handle assembly of claim 16, wherein the seat device comprises at least one of a seat belt, a seat belt bolster, and a seat air bladder.

18. The assist handle assembly of claim 13, wherein the vehicle function comprises at least one of adjusting vehicle suspension shocks.

19. The assist handle assembly of claim 13, wherein the communication link comprises a wireless communication link, and wherein the wireless communication link is configured to communicate with a controller onboard the vehicle.

20. The assist handle assembly of claim 13, wherein the one or more proximity sensors comprises one or more capacitive sensors.

* * * * *

UNITED STATES PATENT AND TRADEMARK OFFICE
CERTIFICATE OF CORRECTION

| | | |
|---|---|---|
| PATENT NO. | : 11,708,016 B2 | Page 1 of 1 |
| APPLICATION NO. | : 17/141356 | |
| DATED | : July 25, 2023 | |
| INVENTOR(S) | : Stuart C. Salter et al. | |

It is certified that error appears in the above-identified patent and that said Letters Patent is hereby corrected as shown below:

In the Claims

Column 12:
Claim 1, Line 46;
After "the" insert -- sensed --

Signed and Sealed this
Seventh Day of November, 2023

Katherine Kelly Vidal
*Director of the United States Patent and Trademark Office*